UNITED STATES PATENT OFFICE.

MAX FESSLER, OF PFORZHEIM, GERMANY.

PROCESS OF MAKING CHAINS.

No. 876,792.    Specification of Letters Patent.    Patented Jan. 14, 1908.

Application filed July 8, 1907. Serial No. 382,790.

*To all whom it may concern:*

Be it known that I, MAX FESSLER, a subject of the German Emperor, residing at Pforzheim, Baden, German Empire, have invented certain new and useful Improvements in the Manufacture of Chains, of which the following is a specification.

My invention relates to the manufacture of wire chains, and more particularly of ornamental chains for personal wear.

In making such chains from solid wire, it is, as is well known, extremely troublesome to apply the small pieces of solder to the parts of the links to be united. To overcome this inconvenience a method has been devised of employing so-called "self-soldering" or "cored wire", that is to say, hollow wire containing a core of ordinary silver solder. The links made of such wire, after being wetted with a suitable soldering fluid, are heated to the fusing point of the solder core. The latter thus becomes fluid, flows out of the hollow wire and metallically unites the two adjacent ends of the link. Thus what is here done is simply to make use of the well-known property of heated solder, e. g. silver solder,—to run, whereby the ends of the link are united or "shut". This method, however, is attended with serious disadvantages. For on the molten or liquid solder flowing out of the wire, not only is the interstice between the two ends of the link, that is, the joint, filled with solder, but the latter runs over a portion of the surface of the link, so that the part is thickened, rendering subsequent trimming up necessary. A further inconvenience of this overflow of solder over the link surface is that the links, especially when a chain is being soldered link by link in succession, very frequently adheres, that is to say, they get soldered one to the other, so that the chain is rendered rigid. The high price of the cored wire—due to the percentage of silver in the core—is also a drawback, especially in the manufacture of cheap jewelry. In view of all this the new method has not met with much favor in practice.

The purpose of my invention is to obviate the inconveniences above referred to, and this I do by taking advantage of the property of certain solders to "make" a joint even when they are only in a soft condition, that is, at a temperature which is considerably below the melting point of the solder in question.

It is well known that all solders prior to becoming actually fluid, grow soft, that is are converted into a pasty, plastic condition. This change in form occurs at the so-called "softening point", which is naturally always below the actual melting point. In this plastic condition certain solders possess a property not hitherto remarked, viz. that of uniting joints at the temperature in question. It is obvious that if such a solder is employed as core for a hollow wire, for instance in making ornamental chains, all the disadvantages attending the use of ordinary cored wire are overcome. On heating links of wire having a core which will shut a joint in the merely plastic condition, the core, owing to the different coefficients of expansion, will expand somewhat more than the shell of the wire containing it. The two ends of the core thus protruding from the hollow wire will contact and in endeavoring to mutually force each other back will flatten out. In this manner the joint will be filled out with metal, without the surface of the links, however, getting smeared with solder. The procedure involved is obviously, that the ends of the core, caused to protrude by the heat, after mutually flattening each other, weld together and thus effectively shut the joint in the link.

A solder fully answering the requirements in question and being at the same time extremely cheap, is so-called "black brass," already well known as a flowing solder. If, for instance, for ornamental chains a wire having a black brass core is employed, the link ends can be shut at a temperature nearly 100 degrees centigrade below the melting point of the said solder. When such a cored wire is employed, the soldering of the links can proceed perfectly mechanically, without there being any danger of troubles arising such as is the case when ordinary cored wire is used. There is also the additional advantage, that since solder containing no silver may be used, great economy can be effected, a matter of much importance especially in the manufacture of cheap ornamental chains.

Having thus described my invention, I claim as new—

The process of soldering wire chain links, consisting in heating wire having a solder core which will unite surfaces even when it is only at softening point, and in stopping the heating when the core is plastic but still below its melting point, whereby the core ends are caused to protrude and unite, and after mutually flattening each other to shut the entire joint, substantially as described.

In testimony whereof I affix my signature in presence of two witnesses.

MAX FESSLER.

Witnesses:
 FRANZ ANTON HUBLUCH,
 R. WADHAMS FISHER.